(12) United States Patent
Munoz

(10) Patent No.: US 6,705,131 B1
(45) Date of Patent: Mar. 16, 2004

(54) YARN PROCESSING SYSTEM

(76) Inventor: Regis Munoz, 7, rue du Tramway, 10310 Ville sous la Ferte (FR)

( * ) Notice: Subject to any disclaimer, the term of this patent is extended or adjusted under 35 U.S.C. 154(b) by 0 days.

(21) Appl. No.: 10/111,354

(22) PCT Filed: Oct. 30, 2000

(86) PCT No.: PCT/EP00/10671

§ 371 (c)(1),
(2), (4) Date: Aug. 20, 2002

(87) PCT Pub. No.: WO01/31410

PCT Pub. Date: May 3, 2001

(30) Foreign Application Priority Data

Oct. 29, 1999 (SE) .............................................. 9903936

(51) Int. Cl.[7] .............................................. D04B 15/38
(52) U.S. Cl. .................................................. 66/125 R
(58) Field of Search .............................. 66/125 R, 146, 66/231, 232, 237; 700/141, 139, 14

(56) References Cited

U.S. PATENT DOCUMENTS

| 4,638,299 A | 1/1987 | Campbell | |
|---|---|---|---|
| 4,682,168 A | * | 7/1987 | Chang et al. .......... 340/825.65 |
| 4,910,628 A | * | 3/1990 | Minagawa et al. .... 340/310.02 |
| 4,965,567 A | | 10/1990 | Meyer |
| 5,089,974 A | | 2/1992 | Demeyer et al. |
| 5,323,324 A | | 6/1994 | Fredriksson |
| 5,838,570 A | * | 11/1998 | Barea ......................... 700/143 |

FOREIGN PATENT DOCUMENTS

| DE | 44 25 250 | 1/1996 |
|---|---|---|
| EP | 0 150 592 | 8/1985 |
| EP | 0 316 536 | 5/1989 |
| EP | 0 913 954 | 5/1999 |
| WO | WO 97/31454 | 8/1997 |

* cited by examiner

Primary Examiner—Danny Worrell
(74) Attorney, Agent, or Firm—Flynn, Thiel, Boutell & Tanis, P.C.

(57) ABSTRACT

In a yarn processing system including a textile machine (M), accessory equipment (A) along yarn channels (C) extending towards said textile machine (M), a computerised control and monitoring network arrangement with network participating electronic devices (D) and at least one control unit (CU), said network arrangement having at least one DC-power supply line to said devices and said control unit and message transmission paths inter-linking said control unit and said devices, said message transmission paths are combined in a common message transmission bus which is constituted by the conductive part (17) of the DC-power supply line (P).

10 Claims, 5 Drawing Sheets

YARN PROCESSING SYSTEM

FIELD OF THE INVENTION

The present invention relates to a yarn processing system including a computerized control and monitoring network arrangement.

BACKGROUND

In such a yarn processing system (U.S. Pat. No. 5,323,324 A) a computerised control and monitoring system is used for the different yarn channels. Said system comprises a two line message transmission bus to which all participants are connected. In the network, messages are transmitted which are ranked by different priorities so that messages of highest priority will be transmitted first. A digital communication protocol with standardised mechanical features is used. However, in addition to the message transmission bus and the respective connection of all the participants to said bus, separate DC-power supply lines are provided for the respective participants needing DC-power for operation. In case of a considerable number of yarn channel DC-power lines and the message transmission bus cables still create a large number of vulnerable spots where mechanical damage can occur.

In a terminal unit of an information transmission system according to EP 0 316 536 A2 a serial transmission of an AMI (alternate mark inversion mode) coded baseband signal is superposed on the supply voltage by using the power supply line for signal transmission and power transmission. A polarity detecting and polarity switching circuitry is employed to attain a non-polarised transmission connection.

DE 44 25 250 C1 discloses an arrangement for transmitting power and data on a two line bus. Two different information carriers are used in order to attain a simultaneous bi-directional data communication. Said information carriers are voltage and current. Data emitted from the electronic devices is available in the bus in the form of current signals. The bus master device emits voltage signals.

It is an object of the present invention to simplify a yarn processing system of the kind as disclosed in order to minimise the cabling, particularly in case that a considerable number of DC-power supply participants along the yarn channels towards a textile machine also need to communicate at least with one control unit by electronic signal messages for controlling, monitoring, supervising, measuring, acting or reacting purposes.

In the yarn processing system according to the invention any separate signal or message transmitting cables are omitted. Instead, the conductive part of the common power supply line is used as the combined message transmission path for the participants in the network. Said measure is reducing the number of cables to a minimum and as such is considerably reducing the potential danger of mechanical damage to cables. Furthermore, particularly in case of a yarn processing system having a plurality of yarn channels and a corresponding large number of network participating electronic devices, the cabling is simplified and reduced to the necessary minimum. Said minimum is the common power supply line itself connecting all participants to the DC-power supply as necessary for the correct function of all the devices and of the control unit. Despite omitting separate message transmission paths the participant in the network can communicate reliably and fast, however, not on separate structural message transmission lines, but directly on the conductive part of the power supply line, because it has been found that the conductive part of a DC-power supply line as intended for effecting DC-power supply surprisingly also can be used for transmitting electronic signal messages carried by frequency modulated radio frequency carrier waves without any danger of interference and with the particular advantage of the already efficient shielding of the conductive part of the power supply line, e.g. against electric or electronic noises or magnetic fields. Due to only the minimum of cabling the danger of mechanical damage is reduced significantly, the reliability of the message transmission is enhanced by using frequency modulated radio frequency carrier waves, as well as the quality of the message transmission. Additionally, no cabling preparation of the yarn channels for the message transmission is needed.

Embodiments of the invention will be described with the help of the accompanying drawings.

DETAILED DESCRIPTION

Figure 1:
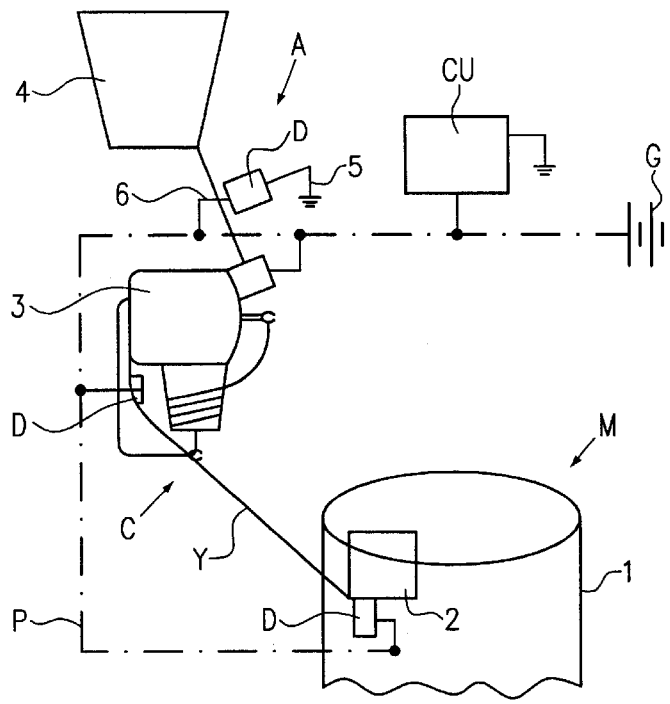
FIG. 1 is a schematic diagram of a yarn channel of a knitting machine.

In the yarn processing system as shown in the figures, along the yarn channels extending towards the respective textile machine, a plurality of equal or different electric or electronic devices are positioned in order to control, measure, monitor, process or sense the respective yarn directly or via contacting or contactless components. Said devices when powered, generate signals or respond to signals and execute functions. Some of the devices need to be set, e.g. by parameters, e.g. depending on the desired operational behaviour or the yarn quality. The operation of the devices in some cases has to be supervised or monitored by communications. For those reasons at least one control unit is provided. The communication takes place by messages representing signals, parameters, faults, measured values, etc. All of the devices as well as the control units in the network are powered by DC-power originating from at least one DC-power source. In conventional systems of that kind, separate lines were provided for the DC-power supply and the message transmission. However, according to the invention the conductive part of the power supply line for the participants in the network simultaneously is used to transmit the necessary messages even in both directions.

Each participant in the network has to have an emitter/transmitter for the electronic type messages, a communication microprocessor for obtaining messages and for an autonomic dialogue and needs to have a continuous power supply. Preferably the emitter/transmitter is a radio transmitter/emitter designed for transmission by radio waves modulated with e.g. ASK, FSK or other modulation principles. Each participant owns or receives an identification code. The construction of the messages representing e.g. signals, is universal in order to be able to handle all types of messages. The respective signal or message preferably is amplified by an electronic circuit prior to its transmission. Each microprocessor configures the radio signals in an analogous fashion and analyses the same and constructs a numerical frame which when decoded allows to use the different data given for control purposes, monitoring purposes, registering purposes, etc. Among the data contained in the numerical frame a code of the emitter, a code of the destination device, a command to execute, or different data and parameters are contained as well as a frame key code. During communication the numerical frame is received by all participants, the microprocessors of which have their own identification codes. In case that a frame is received, the microprocessors compare their identification code with the identification code contained in the frame and the designated participant will execute or respond according to the command as received. The other participants then do not execute or respond. In case that a microprocessor detected internally that the frame as received is destined for its device, it first checks whether the frame is not erroneous. For that purpose, the microprocessor is calculating a numerical key with the help of all the bits contained in the received frame and compares its numerical key with the key code contained in the frame. If the result then gives the value zero this is taken as a confirmation that the received frame does not contain a transmission error. With this condition the microprocessor passes on the command contained for execution, so that its associated device is reacting accordingly, and e.g. sends out a confirmation message to or asks for data from the first emitting device, e.g. the control unit.

In order to emit information in the form of a message, the respective device by the configuration of its microprocessor is constructing a numerical frame which then is transmitted with a carrier wave and an analogous signal. Said analogous signal can be amplified in order to reliably reach other participants or the control units. Due to the coding mode the number of devices which can be integrated into the network and which can communicate simultaneously is practically unrestricted. The message transmission takes place on the conductive part of the power supply line to which conductive part all participants have message access by their connectors.

The power supply line forms a local network. The transmission is made by radio waves which are frequency modulated. Using the conductive part of the power supply line for message transmission assures high security of the communication and avoids disturbances by noise or parasitic hertzian waves. The transmission of the frequency modulated radio waves on the conductive part of the power supply line does not influence the voltage of the power supply. Moreover, the voltage of said power supply is without any influences on the communication. Even in the absence of power supply voltage the communication by frequency modulated radio waves remains possible among all participants.

A yarn processing system in FIG. 1 consists of a knitting machine M and at least one accessory A defining a yarn channel C along which a yarn Y is brought into the knitting machine M. For the sake of clarity only one yarn channel C is shown, even though the textile machine M might have many similar or different yarn channels C. A knitting cylinder 1 is equipped with at least one knitting station 2 to which the yarn Y is fed from a yarn feeder 3. The yarn is stored on a yarn bobbin 4. Along the yarn channel C and also integrated, e.g. into yarn feeder 3, are several electric or electronic devices like sensors, switches, measuring devices, monitoring devices or other signal generating devices as well as devices responding by a predetermined function to signals. Examples of such devices are: yarn running detector, yarn tension detector, yarn store monitoring and supervising sensors, yarn brakes, yarn take-up mechanisms, yarn breakage sensors, etc. Each of said devices D is powered by DC-power originating from a DC-power source G and a power supply line P. The devices are e.g. grounded at 5 and each has a connector 6 connecting the respective device to the power supply line P. The devices either directly co-operate with the yarn or with the help of components, e.g. like opto-elements or the like. At least one control unit CU is provided, also connected to the power supply line and, if desired, further connected to the control system of the textile machine and the accessory A. The signals generated by the respective devices as well as commands or parameters from the control unit to the devices or a respective device are transmitted on the conductive part of the power supply line P.

Figure 2:
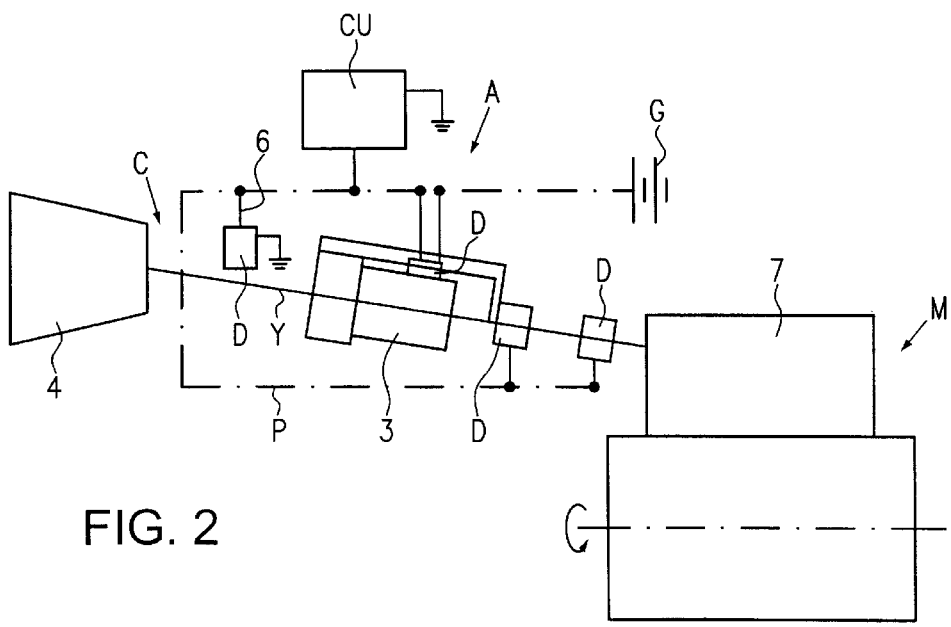
FIG. 2 is a schematic diagram of a yarn channel of a weaving machine.

A yarn processing system in FIG. 2 includes a weaving machine as the textile machine M and an accessory A defining a yarn channel C towards the weaving machine. The yarn Y is taken from a bobbin 4, is stored in a yarn feeder 3 and then is fed into a shed 7 of the weaving machine. Only one yarn channel C is shown, even though the yarn processing system might include several yarn channels C. Along each yarn channel C, even within the yarn feeder 3 electric or electronic devices D are provided and are connected by connectors to the common power supply line P connected to a DC-power supply G. At least one control unit CU is provided. The devices D are connected to ground at 5 and have their connectors 6 to the power supply line P. Examples of such devices: a weft yarn detector monitoring the run or stop of the yarn Y, the yarn store sensors in the feeder 3, an output brake or tensiometer at the outlet of the feeder, a yarn breakage sensor, a yarn tension measuring detector, a yarn cutter, etc. The devices D are generating signals and/or are responding to received signals or commands by executing predetermined functions. Some or all of the devices can be set by parameters varying their operational behaviour, like the sensor sensitivity of the sensor arrangement in the yarn feeder 3 or the braking effect of a yarn brake. Said signals and commands as well as confirmation signals and fault signals or trigger signals are transmitted on the conductive part of the power supply line between the participants in the network thus created.

Figure 3:
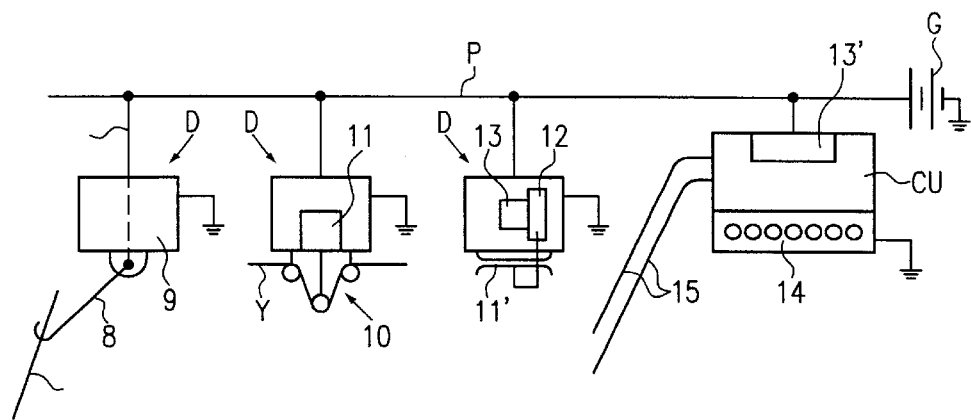
FIG. 3 is a schematic general view of concisely shown electronic devices and a control unit in a network using a common DC-power supply line also as a message transmission path.

In the schematic view of FIG. 3 the left device D can be a yarn monitor having an arm 8 contacting the yarn Y in order to e.g. detect the proper yarn tension or the yarn movement. The arm 8 might be deflected so that it actuates a switch 9 generating the signal which is then transmitted via connector 6 into the power supply line.

The middle device D can be a tensiometer measuring and monitoring the tension in the yarn by a tension pick up arrangement 10 and an evaluation circuit 11. Signals, representing the tension or certain changes of the tension, etc. are transmitted on the power supply line P towards control unit CU.

The right device D shown in FIG. 3 can be a controlled yarn brake having adjustable brake elements 11' and an actuation drive 12 as well as an internal control unit 13. The braking effect can be adjusted by transmitting parameters on the power supply line. Moreover, the brake actuation can be timed in accordance with a predetermined pattern or depending on the operation of the textile machine and by commands emitted by control unit CU. Said control unit CU contains a processing unit 13', may have a monitor display and if necessary, a keyboard 14 for setting certain parameters or for changing between menus and operational modes. Control unit CU can be connected via lines 15 to a superimposed control unit.

Figure 4:
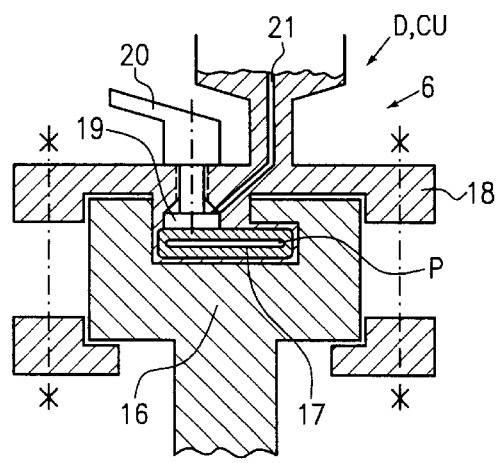
FIG. 4 is a cross-section of a clamping mechanism of one of the devices or the control unit.

FIG. 4 depicts an embodiment of a connector 6 as used for the connection of a device D or the control unit CU to the power supply line P. The respective device D is mounted by clamping means 18 to a holding structure 16. Power supply line P, e.g. in the form of a flat cable, is positioned within said holding structure 16 but is accessible from the upper side. Contact pins 19 here can be driven by a pusher 20 into the conductive part 17 of the power supply line in order to establish galvanic contact between a line 21 of the device and the conductive part 17 of power supply line P. Of course, instead of connector 6 as shown in FIG. 4 a conventional plug connector can be used.

Figure 5:
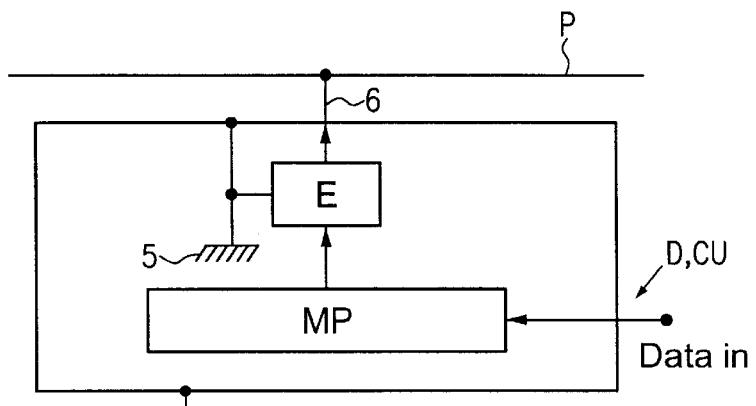
FIG. 5 is a block diagram of an emitting section of a device or the control unit.

In FIG. 5 the message emitting components of a device D or the control unit CU are shown. A communication microprocessor MP is fed with data or signals generated by the device or a control unit D, CU and is constructing a numerical frame containing the message representing the signal in the form of numerical data and outputs said frame together with an analogous signal to a radio emitter E. If desired, an amplifier can be used in this arrangement. The transmission is carried out by radio carrier waves on the conductive part of the power supply line. A proper frequency modulation principle is used, e.g. according to the ULFCM standards, i.e. within a predetermined high frequency range. The frame as constructed by the communication microprocessor MP might contain: an address code for the destination device, a code of the emitting device, a command and/or data and/or a parameter, and a frame key code.

Figure 6:
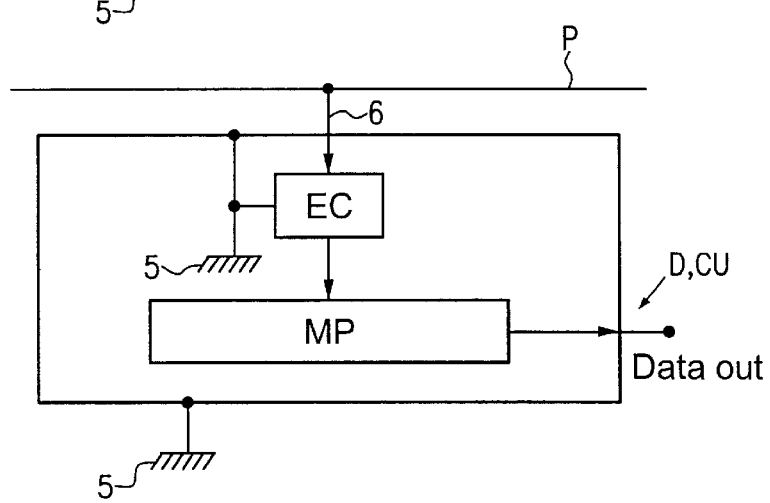
FIG. 6 is a block diagram of a receiving section of a device or a control unit.

In FIG. 6 the message receiving part of a device or a control unit D, CU is shown, including a communication microprocessor MP and a receiving circuit EC between the communication microprocessor MP and the power supply line P. A message received via power supply line P is evaluated and analysed by communication microprocessor MP. The data contained in the message is then output into the device or the control unit, D, CU.

Figure 7:
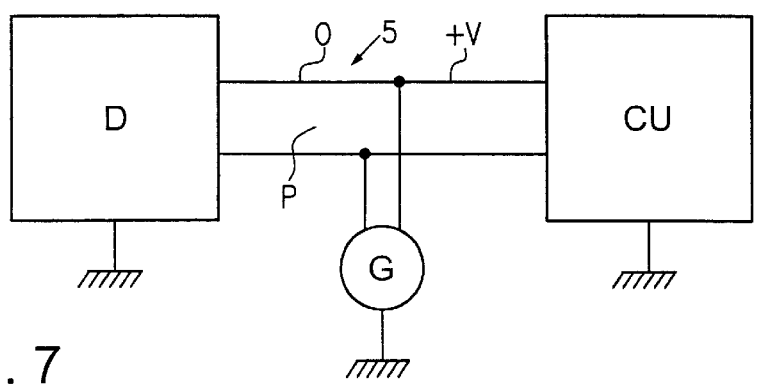
FIG. 7 is an embodiment having two power supply lines.

In the embodiment of FIG. 7 a device D is communicating with control unit CU. The power supply line P in this case is constituted by two lines O and +V both connected to the DC-power source G. In this case line O (zero voltage) can serve as "signal"-ground for the participants in the network, while line +V is used for the transmission of messages.

Figure 8:
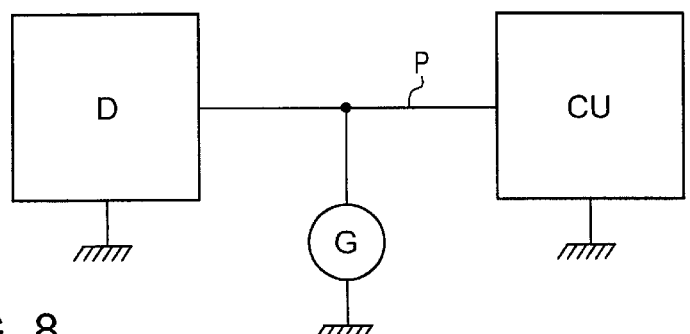
FIG. 8 is another embodiment using a signal DC-power supply line.

In FIG. 8 an embodiment similar to the embodiment of FIG. 3 is shown for one device D and the control unit CU only. Both devices are connected to ground. Power supply line P is connected to the DC-power source G. The power supply line P is used also for message transmission by means of radio carrier waves.

Figure 9:
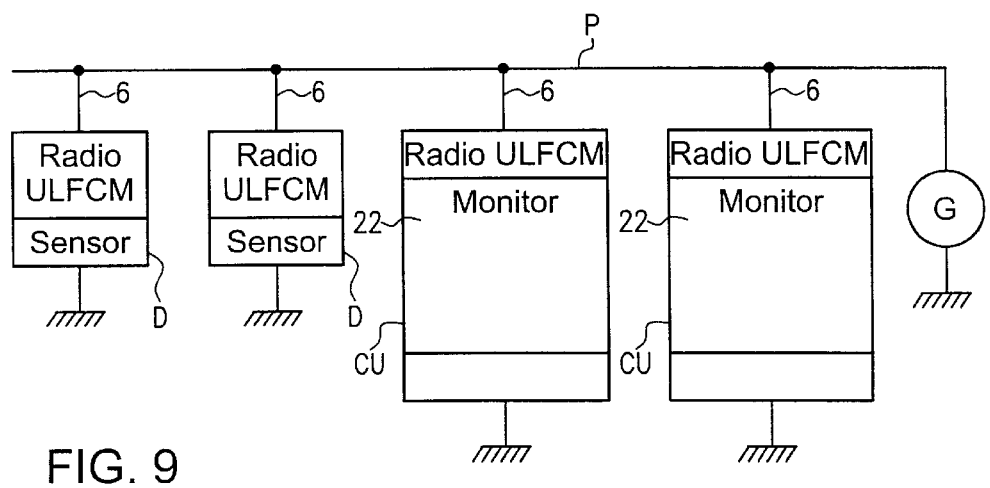
FIG. 9 is A block diagram with a generalised illustration of the structure of the participants in a network connected to a DC-power supply.

In FIG. 9 an embodiment similar to FIG. 3 is shown having several electric or electronic devices D each being connected to a common power supply line P, and further comprising two control units CU also connected to power supply line P leading to the DC-power source G. Each device D is e.g. a sensor and has a combination e.g. of the equipment shown in FIGS. 5 and 6, namely to emit or receive or to emit and receive messages. Each control unit CU can be equipped with a monitor display 22.

In case that the devices should need another DC-voltage for operation than the control unit CU, the control unit CU could be connected to a separate DC-power supply line instead. Connectors 6 then only serve to transmit or receive messages transmitted on the DC-power supply line P to which the devices are connected.

Figure 10:
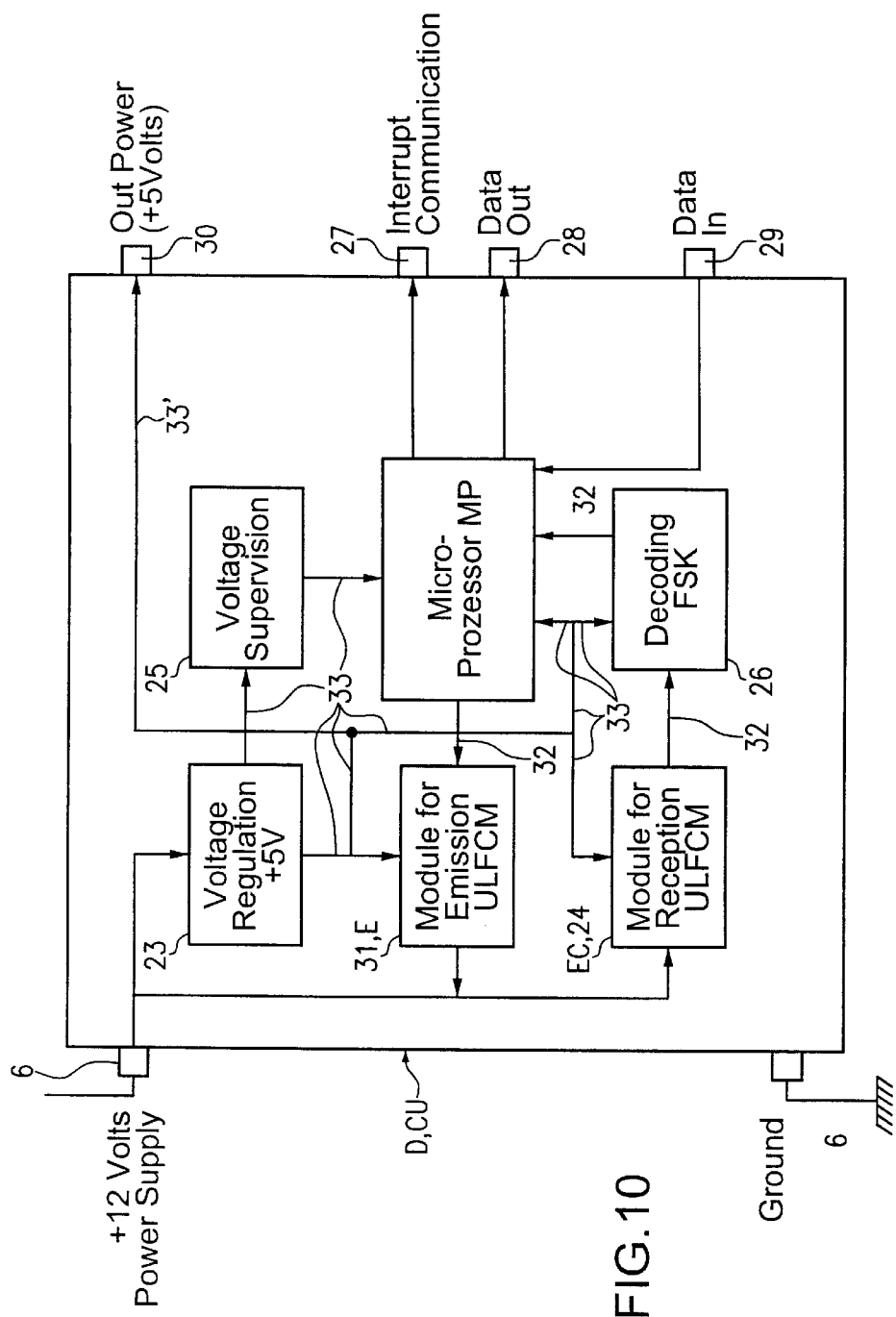
FIG. 10 is Schematically a device designed for radio communication.

FIG. 10 illustrates the schematic design of a device e.g. D, CU for ULFCM-radio transmission (ultra-low frequency chopper modulation). Power supply line P (+12 volts) is connected to port 6 of the device. At 5 the device is connected to ground. Microprocessor MP is connected to the power supply line P within a network of operation power lines 33 via a voltage regulation circuit 23 and a voltage supervision circuit 25. Microprocessor MP has an interrupt communication port 27, a data out port 28 and a data in port 29. A module E, 31 for ULFCM-emission is connected within a network of information lies 32 to the power supply line P and to the microprocessor MP. A module EC, 24 for reception ULFCM is connected within the network of information line 32 to a decoding FSK-circuit 26 connected to the microprocessor MP. Module EC, 24 as well as decoding FSK-circuit 26 both are connected to the network of operation power lines 33. Said network of operation power lines 33 is connected by a separate line 33' to a power out port 30.

What is claimed is:

1. A yarn processing system including a textile machine, and accessory equipment arranged along yarn channels which extend towards said textile machine, the system further including a computerised control and monitoring network arrangement comprising:

network participating electronic devices arranged along said yarn channels for cooperating with a yarn or yarn handling components along said yarn channels;

at least one control unit for emitting or receiving messages to and from said network participating electronic devices;

at least one DC power supply connected via a conductive part of at least one DC power supply line to said network participating electronic devices and to said control unit; and message transmission paths interlinking said control unit and said network participating electronic devices, wherein said message transmission paths are provided as a common message transmission bus which is constituted by the conductive part of the DC power supply line, and wherein said messages are carried on said conductive part by frequency modulated radio frequency carrier waves.

2. A yarn processing system as in claim 1, wherein any message transmission is carried out within the ULFCM-range (ultra-low frequency chopper modulation).

3. A yarn processing system as in claim 1, wherein said radio frequency carrier waves are frequency modulated according to ASK, FSK, or other modulation principles.

4. A yarn processing system as in claim 1, wherein any said network participating electronic device and the at least one control unit are connected by at least one connector to said conductive part of the DC power supply line.

5. A yarn processing system as in claim 4, wherein said one connector is a message transmission connector.

6. A yarn processing system as in claim 4, wherein said one connector is a combined message transmission and DC power transmission connector.

7. A yarn processing system as in claim 1, wherein a said network participating electronic device comprises at least one communication microprocessor for configuring emitted messages and evaluating received messages.

8. A yarn processing system as in claim 4, wherein a said network participating electronic device comprises a clamping mechanism and at least one contact pin for piercing an insulation cover of said DC power supply line and establishing galvanic contact with said conductive part.

9. A yarn processing system as in claim 1, wherein each message is configured as a numerical frame and an associated analogous signal, and wherein said numerical frame comprises a destination address code, an emitter code, a frame key code, and at least one of an order, a command, data and a parameter.

10. A yarn processing system as in claim 1, wherein said control unit is connected to another DC-power supply line and comprises a separate message transmission connector to the DC-power supply line to which said network participating electronic devices are connected.

* * * * *